Sept. 11, 1973 W. K. ZWICKER ET AL 3,758,387
ION DISPLACEMENT CRYSTAL GROWTH
Filed May 10, 1971
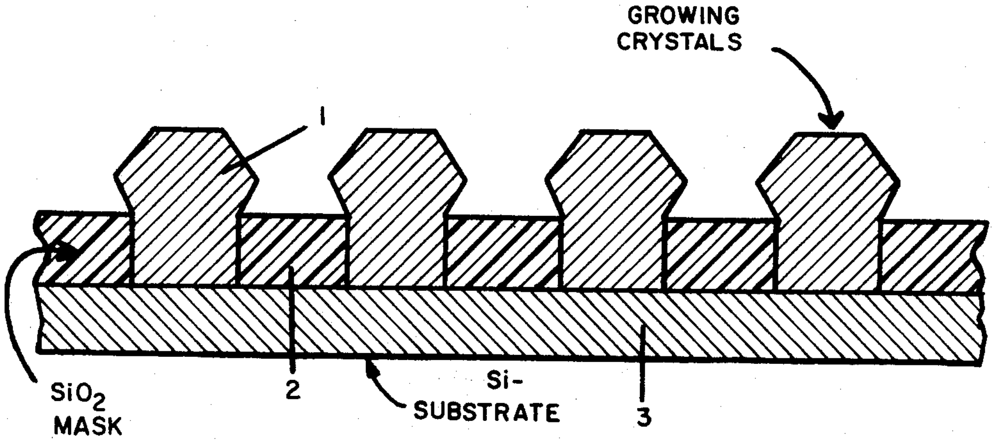
*INVENTORS*
WALTER K. ZWICKER
MICHAEL L. FUCCI
*BY* Frank R. Trifari
AGENT

3,758,387
ION DISPLACEMENT CRYSTAL GROWTH

Walter K. Zwicker, Scarborough, and Michael L. Fucci, Ossining, N.Y., assignors to U.S. Philips Corporation, New York, N.Y.

Filed May 10, 1971, Ser. No. 141,692
Int. Cl. B01j *17/00;* B44d *1/18;* C23b *5/48*
U.S. Cl. 204—15 11 Claims

ABSTRACT OF THE DISCLOSURE

A method of growing single crystals of a metal or a semiconductor on a substrate which may be either a metal or a semiconductor by electrolytic displacement of the metal or metalloid and deposition through holes in a mask covering the substrate, the mask consisting of a material which is inert to the material being deposited.

Our invention relates to crystal growth and more particularly to methods of growing single crystals or arrays of such through holes of suitable masking media inert toward the material being deposited onto small areas of a substrate.

The successful growth of a monocrystalline heteroepitaxial film requires a number of conditions to be fulfilled. Factors influencing these are epitaxial lattice match, surface diffusion, nucleation and coalescence of the nuclei. The larger the area of epitaxy, the more difficult it becomes to fulfill all the necessary conditions and therefore it becomes also increasingly difficult to obtain a single crystal film. If, on the other hand, the area of epitaxy is made very small and the growing crystal is forced to grow vertically rather than horizontally, single crystals or small areas of single crystal films of most any material can be grown heteroepitaxially. This can be accomplished by making the surface of a material, which forms suitable bonds and exihibits a favorable atom-atom interaction with the growing material a substrate upon which the deposited material can grow. The masking material itself should act inert toward the growing material forming none or only very weak bonds with it. The holes in the mask which expose small areas of the substrate have to be kept to a size suitable for growth of a single crystal. The technique, described above, has been applied successfully in the past not only for homoepitaxial growth of silicon on silicon and germanium on germanium, but also for heteroepitaxial growth of semiconductors on other semiconductor materials, e.g. germanium on gallium arenside.

It is, therefore, an object of our invention to grow any material on any substrate, whether the growth be homoepitaxial or heteroepitaxial.

In accordance with the invention we can grow single crystals of metals or semiconductors of uniform size or arrays of such through holes of an insulating masking media onto small areas of a substrate, consisting of a metal or semiconductor body, by an electrolytic displacement technique, whereby the crystals can grow either crystallographically, randomly, oriented or crystallographically aligned with the crystal lattice of the substrate.

In order to successfully grow crystals by this method it is essential that the established potential (relative to the solution) of the surface of the metal or semiconductor substrate be greater than that required to grow the metal or semiconductor crystallite.

It is also essential that nucleation be controlled; otherwise, displacement plating, in the form of a polycrystalline film over the surface of the substrate, will occur. Such controlled nucleation will take place if the substrate is covered by an insulating film with holes of suitable size which expose small areas of the substrate only. During displacement, areas under the mask will be undercut.

Nucleation will occur first at the rims of such holes and the formed crystallite acting as a seed can grow eventually to a single crystal, covering the entire hole.

In accordance with the invention the substrate, i.e. a metal or semiconductor body which may, but does not necessarily have to consist of a single crystal, after polishing and etching is coated with a suitable insulating film (e.g. $SiO_2$, $Si_3N_4$, $Al_2O_3$, etc.) of suitable thickness.

Subsequently, areas of exposed substrate of desired geometry and in desired positions in respect to each other but of suitable size are produced by fabricating holes in the insulating film by suitable means such as by mechanically piercing the film or by standard photoresist techniques.

Thereafter, the masked metal or semiconductor body is placed in a plating solution for a period of time appropriate for the growth of the crystals to a size desired. Both concentration of cations and types of anions in the electrolyte as well as temperature will effect the nonequilibrium half-cell potential at the substrate interface and therefore also the growth rate of the crystals and their habit. If the substrate is a semiconductor, both growth rate and habit of the crystals are additionally influenced by doping, doping intensity, light and surface recombination velocity.

The new crystal growth method according to the invention has several advantages over known conventional techniques. Growth of metal or semiconductor crystals can be carried out at room temperature. The only equipment required is that for masking. Distribution of the displacing cations is nearly uniform throughout the electrolyte, with the exception of the areas adjacent the interface contrary to conditions existing in an electrolytic cell, during electrocrystallization. Moreover, large amounts of small single crystals can be grown uniformly through an array of holes of a mask onto a relatively small substrate (up to 8 million crystallites per square inch of substrate area).

The following example is illustrative of the method according to the invention describing the growth of single crystals of silver and copper on silicon. The method herein described is applicable to the deposition of other metals and semiconductors as well, on this, as well as other substrate materials with immaterial variations in the process conditions.

Silver and copper single crystals were grown onto the surface of a silicon wafer (10 ohm-cm. phosphorus doped) through 8 micron round holes in a 1 micron thick oxide layer, which were etched by standard photoresist techniques. The wafers were submerged at room temperature into an aqueous bath containing 7 mols of ammonium fluoride and 1 mol of silver or copper nitrate respectively. The reactions, in the case of silver, proceed as follows:

(1) $Si+6F^{-}=SiF_6^{--}+4e^{-}$; $E^\circ=1.2$ (2) $Ag^{+}+e^{-}=Ag$; $E^\circ=-0.799$—Ag will displace Si.

The reactions for copper are similar.

The sole figure of the drawing is a cross-section of the sample during growth.

Single crystals 1 of silver (Ag) or copper (Cu) grow through holes in a silicon dioxide mask 2 on a silicon substrate 3. Single crystals of silver, about 10 x 10 microns in diameter, grew within 1 minute out of an 8 micron hole in the oxide mask. Single crystals of copper grew in the form of about 2 microns in thickness and in whiskers up to 50 microns in length out of 8 micron holes within 30 minutes.

The method according to the invention may be applied for the production of large amounts of small single crystals (powders) for magnetic tape or other applications; for the production of seeds for other subsequent crystal growth operations; and/or for the production of arrays of single crystals for integrated magnetic memories or electro-optical applications.

What is claimed is:

1. A method of forming individually separate single crystals of any element capable of being displacement coated upon a suitable substrate, comprising the steps of:

selecting a substrate and a solution which would displacement coat said substrate with an element upon immersion of said substrate in said solution;

covering at least a portion of said substrate with an insulating mask which is inert to said element;

forming at least one aperture in said mask to expose an area of substrate surface which is sufficiently small to permit only one crystal of said element to form in said aperture through ion displacement; and bring said exposed area of substrate into contact with said solution until a single crystal of said element forms in said at least one aperture and grows to a suitable size.

2. The method of claim 1 wherein said at least one aperture is formed using a known photoresist method.

3. The method of claim 1 wherein said at least one aperture is formed to expose an approximately circular area of substrate of approximately eight microns in diameter.

4. The method of claim 1 wherein said covering step comprises the step of forming an insulating film on at least a portion of said substrate, said film being inert to said element.

5. The method of claim 4 wherein said film is formed to a thickness of approximately one micron.

6. The method of claim 1 wherein said selected substrate comprises silicon and said selected solution contains ions of silver or copper, thereby resulting in the formation of individually separate single crystals of silver or copper respectively.

7. The method of claim 6 wherein said selected solution comprises aqueous ammonium fluoride and silver or copper nitrate.

8. The method of claim 6 wherein said at least one aperture is formed to expose an approximately circular area of substrate of approximately eight microns in diameter.

9. The method of claim 6 wherein said covering step comprises the step of forming on at least a portion of said substrate a film of silicon dioxide.

10. The method of claim 9 wherein said film is formed to a thickness of approximately one micron.

11. A method of forming individually separate single crystals of silver or copper, comprising the steps of:

covering at least a portion of a substrate comprised of silicon with a silicon dioxide film having a thickness on the order of one micron and having at least one aperture exposing an area of substrate surface of dimensions on the order of eight microns; and bringing said exposed area into contact with an aqueous solution of ammonium fluoride and silver or copper nitrate until a single crystal of silver or copper respectively forms through ion displacement in said at least one aperture and grows to a suitable size.

References Cited

UNITED STATES PATENTS

| | | | |
|---|---|---|---|
| 3,013,955 | 12/1961 | Roberts | 117—130 R |
| 3,558,349 | 1/1971 | Kneppel | 117—130 R |
| 3,600,294 | 8/1971 | Rubin et al. | 204—3 |
| 3,324,015 | 6/1967 | Saia et al. | 204—15 |
| 3,580,732 | 5/1971 | Blakeslee et al. | 148—1.6 |

OTHER REFERENCES

Silver Plating of Electrical Contacts by Immersion, by Isidora Geld, Metal Finishing, vol. 58, No. 8, August 1960, pp. 53.

Modern Electroplating, Lowenheim, 2nd edition, 1969, pp. 31–33.

Handbook of Chemistry & Physics, 51st edition, Chemical Rubber Pub. Co. (1970), pp. D111–113.

Kinetics of Copper Electrocrystallization, A. Damjanovic et al., Journal of the Electrochemical Society, vol. 113, No. 5, pp. 429–435 and 440, May 1966.

THOMAS TUFARIELLO, Primary Examiner

U.S. Cl. X.R.

117—212; 148—1.6